United States Patent

[11] 3,568,747

| [72] | Inventors | Henry R. Fletcher<br>Birmingham;<br>Glyn B. Roberts, Sutton Coldfield, England |
|---|---|---|
| [21] | Appl. No. | 718,897 |
| [22] | Filed | Apr. 4, 1968 |
| [45] | Patented | Mar. 9, 1971 |
| [73] | Assignee | The Dunlop Company Limited<br>London, England |
| [32] | Priority | Apr. 18, 1967 |
| [33] | | Great Britain |
| [31] | | 16,196/67 |

[54] PNEUMATIC TIRES
13 Claims, 18 Drawing Figs.

[52] U.S. Cl. .................................................. 152/154,
244/103
[51] Int. Cl. ........................................... B60c 19/00
[50] Field of Search ............................................. 152/353,
352, 157; 244/103 (S); 152/209, 154

[56] References Cited
UNITED STATES PATENTS

| 2,383,662 | 8/1945 | McClaskey .................. | 244/103 |
| 2,439,033 | 4/1948 | Antonson ..................... | 244/103 |
| 2,457,899 | 1/1949 | Hursh ........................... | 152/353 |
| 3,233,849 | 2/1966 | Rubin ........................... | 152/353 |
| 3,400,745 | 9/1968 | Schwartz ...................... | 152/209 |
| 3,204,681 | 9/1965 | Olagnier et al. .............. | 152/154 |
| 3,457,981 | 7/1969 | Verdier ........................ | 152/209 |

*Primary Examiner*—James B. Marbert
*Attorney*—Stevens, Davis, Miller & Mosher

ABSTRACT: A pneumatic tire provided with a plurality of generally axially outwardly extending faces on at least one of its shoulder portions. The faces may engage with water standing on the surface over which the tire is to run and/or may be engaged with water thrown up from the surface. This engagement imparts a rotational effect to the tire in the manner of a turbine, which tends to reduce the slipping of the tire on the surface. The engagement also tends to reduce the trajectory (angle and distance) of the water thrown up from the surface by the tire.

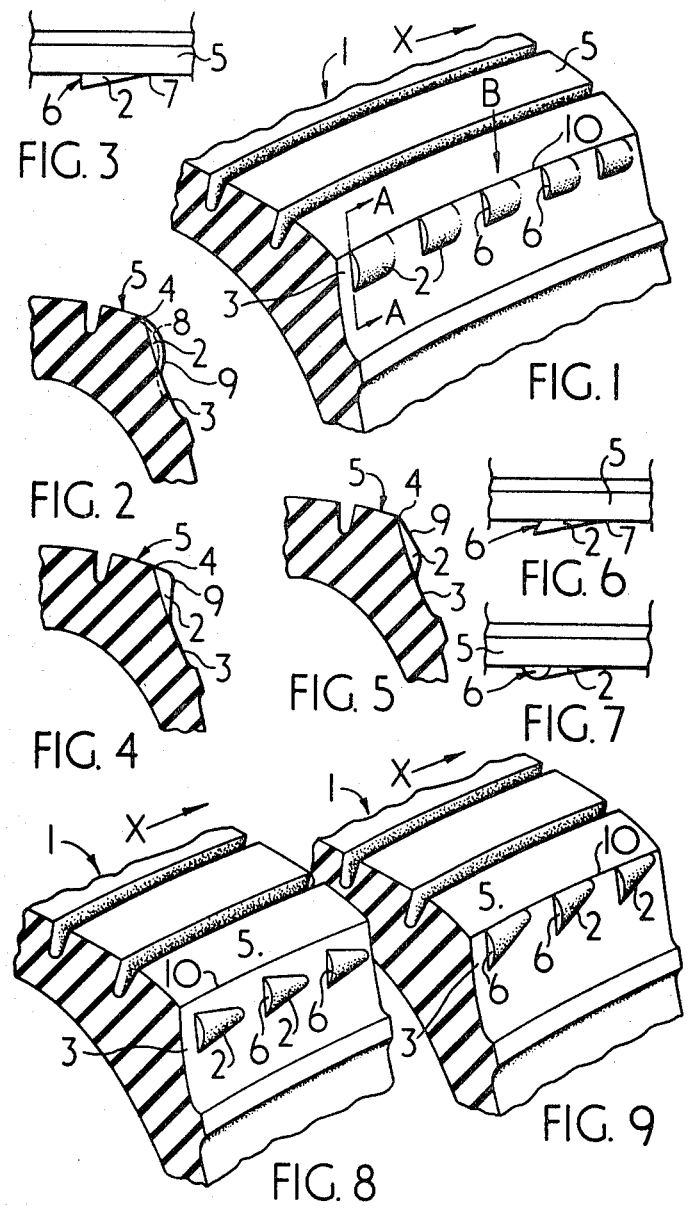

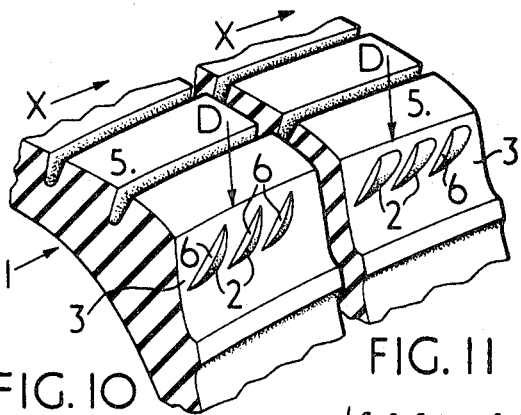
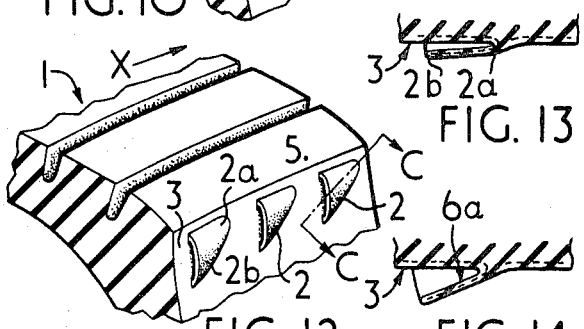
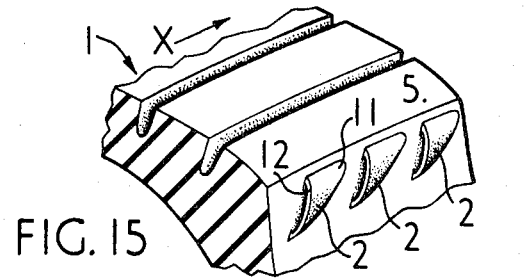
FIG. 10  FIG. 11  FIG. 12  FIG. 13  FIG. 14  FIG. 15

PNEUMATIC TIRES

This invention relates to pneumatic tires.

When an aircraft lands on a wet runway several potentially dangerous phenomena may occur. Firstly, the tires may be stationary thereby seriously reducing effective braking. Secondly soft, tacky rubber tread areas may be formed by contact of the tread with the wet runway which prevent adequate braking and may lead to tire failure. Thirdly, water up from the runway by the tires may enter the aircraft engines causing them to lose power or cutout. This water ingestion phenomenon may also occur in the takeoff phase of operation when it is potentially more dangerous.

The water thrown up referred to in the preceding paragraph is often in the form of a moving curtain of a fine spray or heavy mist which tends to remain in the air for some time. Thus the water may dangerously affect another aircraft following behind the one which threw up the water. Additionally this water may impair the views of drivers of other vehicles e.g. tenders which travel on runways in the wake of aircraft. A similar phenomenon is the spray formed by vehicles traveling at high speed over wet surfaces e.g. cars and trucks on wet highways, and is similarly potentially dangerous because of the resulting impaired views of drivers of following vehicles.

It is an object of the present invention to provide an improved form of pneumatic tire which will assist in avoiding or will avoid at least one of the aforementioned difficulties.

According to the invention a pneumatic tire comprises a tread portion and two shoulder portions, one at least of which shoulder portion is provided with a plurality of generally radial and axially outwardly extending faces projecting into the region adjacent to the tire shoulder said faces being disposed so that they will be engaged by water associated with a surface over which the tire is to run to tend to decrease the relative velocity of the tread portion and the surface during movement of the tire upon said wet surface.

The faces may be engaged by water standing upon the surface and/or water thrown up from said surface during said tire movement and may be formed upon rubber elements attached to or moulded upon the tire at least one face on each element. These elements may be solid blocks or pockets and in the latter instance the face is formed on an interior surface of the pocket which is capable of opening up to receive water.

The engagement of the water with each face tends to decrease the relative velocity of the tread and the surface; thus if the tire is not rotating the engagement initiates the rotation, if the tire is rotating relatively slowly the engagement increases the rate of rotation, or, if the tire is already rotating relatively rapidly, merely maintains this rate of rotation. The tire, during its movement across the wet surface may therefore be rotating without any substantial slip, slipping and rotating or slipping without rotating.

Four embodiments of the invention will now be described, by way of example, with reference to the accompanying drawings of which:

FIG. 1 is a perspective view of part of an aircraft tire according to the first embodiment of the invention;

FIG. 2 is an axial cross section taken along the line A-A of FIG. 1;

FIG. 3 is a view in direction of arrow B in FIG. 1;

FIG. 4 is an axial cross section taken along the line A-A of FIG. 1 showing a first modification of the first embodiment;

FIG. 5 is an axial cross section taken along the line A-A of FIG. 1 showing a second modification of the first embodiment;

FIG. 6 is a view taken along the arrow B of FIG. 1 showing a third modification of the first embodiment;

FIG. 7 is a view taken along the arrow B of FIG. 1 showing a fourth modification of the first embodiment;

FIG. 8 is a perspective view of part of an aircraft tire according to the second embodiment of the invention;

FIG. 9 is a perspective view of part of an aircraft tire showing a first modification of the second embodiment of the invention;

FIG. 10 is a perspective view of part of an aircraft tire showing a second modification of the second embodiment of the invention;

FIG. 11 is a perspective view of part of an aircraft tire showing an alternative form of the second modification of the second embodiment of the invention;

FIG. 12 is a perspective view of part of an aircraft tire according to the third embodiment of the invention;

FIG. 13 is a sectional view along the line C-C in FIG. 11;

FIG. 14 is a sectional view along the line C-C in FIG. 12 when the pocket it is filled with water;

FIG. 15 is a perspective view of part of an aircraft tire showing a modification of the third embodiment of the invention;

Figures 16, 17:
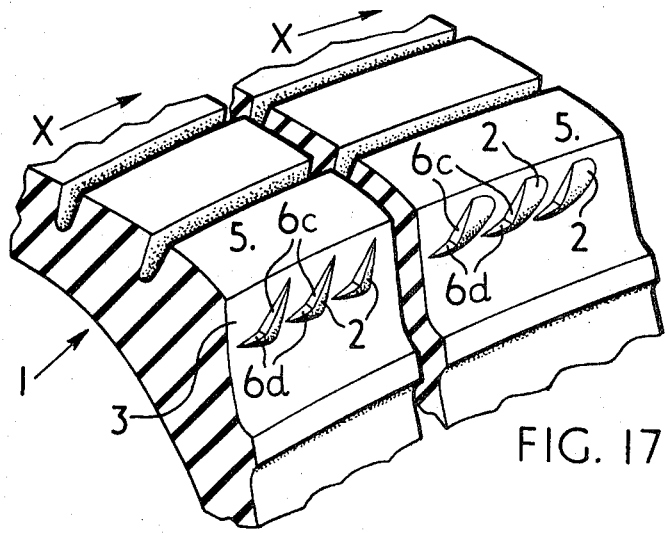
FIG. 16 is a perspective view of part of an aircraft tire showing one form of the fourth embodiment of the invention.
FIG. 17 is a perspective view of part of an aircraft tire showing a second form of the fourth embodiment of the invention.

In FIGS. 1, 8, 9, 10, 11, 12, 15, 16, 17, and 18 an arrow X indicates the direction rotation of the aircraft tire.

The first embodiment of the invention illustrated in FIGS. 1 to 3 comprises an aircraft tire 1 having a plurality of substantially rectangular (when viewed in plan) rubber blocks 2 moulded integrally on both shoulders 3 of the tire at equally spaced intervals around the shoulder periphery. As shown in FIG. 2 the cross section in a plane containing both the tire axis and a tire radius is substantially that of the sector of a circle, the radially outer extremity 4 of which blends in a substantially smooth curve with the ground-contacting surface of 5 of the tire. A radially extending and axially outwardly projecting face 6 is provided on each block 2 for engagement with water standing upon a surface over which the tire is to run, e.g. an aircraft runway, to initiate, maintain or increase the rate of rotation of the tire. This face in the inflated, underformed state of the tire is part of a plane containing both the axis of and the radius of the tire at that part of the shoulder periphery. The block, as is shown in FIG. 3, is substantially wedge shaped and the edge 7 opposite the face 6 blends in a smooth curve with the tire shoulder 3. A reinforcement 8 in the form of one or more layers of rubberized cord material is also provided in each block, this reinforcement extending substantially parallel to the axially outer surface 9 of the block.

In a first and second modification shown in FIGS. 4 and 5, of the first embodiment just described, the cross sections of the blocks 2 are not those of sectors of circles but are asymmetric in the form of rounded wedges.

In a third modification, shown in FIG. 6, of the first embodiment just described, the fact 6 of each block 2 is not part of a plane containing the axis and the radius of the tire at that part of the shoulder periphery but is part of a plane which contains a radius of the tire and is inclined to a line normal to the shoulder periphery. As can be seen in FIG. 6 an acute angle is formed between the face 6 and the tire shoulder, thus recessing the face.

In a fourth modification, shown in FIG. 7, of the first embodiment, the face 6 of each block 2 is not part of a plane containing the axis and a radius of the tire but is part of a plane which contains a line parallel to the axis and is generally radial being inclined to the radius at that part of the tire shoulder periphery. An acute angle is thus formed between the face and the tread edge 10.

Further modifications (not illustrated) of the first embodiment include a tire having blocks on only one shoulder, a tire having blocks in which no reinforcement is incorporated, a tire having a concave face and a tire having blocks the axially outer extremity 4 of which is spaced radially inwardly of the tread edge. Still further modifications include tires having blocks in which to or more of the aforementioned modifications are combined.

The second embodiment illustrated in FIG. 8 of the invention comprises an aircraft tire 1 provided with rubber blocks 2 moulded to the tire generally of the shape (viewed in plan) of isocoles triangles. Each block is spaced in a radial sense, a small distance from the tread edge 10. A face 6 which forms the base of isocoles triangle is provided on each block, which face forms part of a plane containing both the tire axis and the radius of the tire at that part of the shoulder periphery. The blocks are generally wedge shaped and the rounded apex of the triangle blends smoothly with the tire shoulder.

In a first modification illustrated in FIG. 9, of the second embodiment each block 2 is substantially in the form of a right-angled triangle, one of the sides adjacent to the right angle having a face 6 as just described in the preceding paragraph and the other side adjacent to the right angle being coincident with the tread edge 10. In an alternative form not illustrated, of this modification the block is spaced away from the tread edge as described in the preceding paragraph.

In two alternative forms illustrated in FIGS. 10 and 11 respectively of a second modification of the second embodiment the faces 6 are inclined as described in the fourth modification of the first embodiment. However in addition to being inclined, the radially outer extremity of the face of one block 2 overlaps in a circumferential sense the radially inner extremity of the face on the adjacent block. Thus looking in the radial direction of arrow D in FIGS. 10 and 11 no spaces are seen between adjacent blocks. This construction generally improves the rotative effect of the water engaging the faces.

Further modifications not illustrated to the second embodiment include those modifications described in relation to the first embodiment applied where practically possible to this second embodiment.

A third embodiment, illustrated in FIGS. 12 to 14, of the invention comprises an aircraft tire 1 wherein the blocks 2 are in the form of pockets into which water from a wet surface enters with a scooping action. The pocket is provided with a tapering interior and exterior form (illustrated particularly in FIGS. 13 and 14), narrowing at the end 2a remote from the entry portion 2b, and is provided with an interior face 6a with which water engages to decrease the relative velocity of the tread portion and the tire surface. The pockets are moulded integrally with the tire shoulder and in the moulded inoperative state is in a partly closed position (as in FIG. 13) so as to take up the minimum axial space and thus be in a relatively compact state for retraction of the tire and wheel into the body of the aircraft. When filled with water the pockets open out to the position shown in FIG. 14. A reinforcement in the form of one or more layers of rubberized cord fabric is incorporated in the rubber of the pockets.

In a modification illustrated in FIG. 15 the pockets are inclined with respect to the radius at that part of the shoulder so as to be positioned to engage the maximum volume of water and so to provide the most effective rotational effect.

One modification, not illustrated, of the third embodiment include a pocket which is open at the end remote from the entry portion. The aperture in this remote end is smaller than that in the entry portion and thus passage of water through the pocket is restricted with the result that a pressure is built up in the water in the pocket. This pressure, acting on the interior face of the pocket causes the rotational effect.

Another modification, not illustrated, of the third embodiment comprises a tire having that portion of the shoulder adjacent to the pocket cutaway or formed with a recess, so as to increase the cross-sectional area of pocket for water entry, and the cutaway of formed portion may further be shaped so that, in the part-closed position of the pocket, parts of it can be caused to enter the said portion.

Still further modifications, not illustrated, include those modifications described in relation to the first and second embodiment applied where practically possible to this third embodiment.

Figure 18:
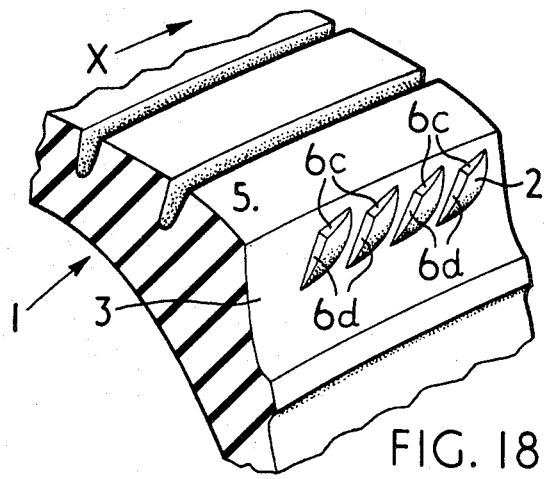
FIG. 18 is a perspective view of a part of an aircraft tire showing a third form of the fourth embodiment of the invention.

A fourth embodiment of the invention, illustrated in three forms in FIGS. 16, 17 and 18 comprises a pneumatic tire 1 provided with rubber blocks 2 as in the preceding embodiments. However, in this embodiment the face 6 provided on each block for engaging standing water is divided into two portion, a radially outer portion 6c disposed generally radially inclined at a small angle to the truly radial direction and a radially inner 6d, each of which is inclined at a different angle to the radius of the tire at that part of the shoulder where the face is located. As illustrated, in each FIG. the extremity of the radially inner portion 6d overlaps, in a circumferential sense, the radially outer portion 6c of the adjacent rubber block. This overlapping is similar to that described in the two forms of the second modification of the second embodiment i.e. the forms illustrated in FIGS. 10 and 11. The inclination of one of the two portions of the faces is such that this one portion is part of a plane which extends substantially parallel to or inclined at a small angle to the ground-contacting surface 5 of the tire. In the two forms shown in FIGS. 16 and 17 the radially inner portion 6d is substantially parallel to the surface 5 while in the form shown in FIG. 18 the radially outer portion 6 is inclined at a relatively small acute angle to the ground-contacting surface 5 the portion 6d being disposed generally radially inclined at a small angle to the truly radial direction.

Further forms, not illustrated, of this fourth embodiment include all those modifications described in relation to the preceding embodiments applied where practically possible to this embodiment.

In the operation of all of the forms, modifications and embodiments of the invention just described, the faces provided on the rubber blocks engage with water associated with the surface over which the wheel runs and causes the wheel to rotate in a similar manner to a turbine. This imparted rotation generally assists in avoiding the first and second aforementioned potentially dangerous phenomena. Also during the said operation the water thrown laterally by tires according to the invention, instead of being in the form of a fine spray or heavy mist as is produced by tires outside the scope of the invention, is in the form of relatively large drops. These drops moved from the tire according to the invention at much lower trajectory angles than the droplets of the fine spray formed by tires outside the scope of the invention, and also do not travel such large distances from the tire. In addition, because of their relatively larger size, they do not remain in the air as the fine spray droplets do.

This latter effect of generally reducing the fine spray of water thrown up is enhanced in those modifications and forms in which the faces are inclined to a radius of the tire and where these inclined faces overlap.

We claim:

1. A pneumatic tire comprising a tread portion and two sidewalls wherein there is provided a plurality of circumferentially spaced-apart generally tapered elements on at least one of said sidewalls exclusively on the tire shoulder portion, the thickness of the element measured in a direction at right angles to the shoulder portion on which element is located decreasing in a circumferential direction to provide a generally tapered form for each element, the maximum width of each element in a direction locally parallel to the shoulder portion occurring at the shoulder, the width of the element being measured in a plane containing the tire axis and local tire radius, a generally radially and axially outwardly extending face being provided on each element projecting into the region adjacent to the shoulder, the faces being disposed so that they will be engaged by water associated with a surface over which the tire is to run to tend to decrease the relative velocity of the tread portion and the surface during movement of the tire upon said wet surface.

2. A pneumatic tire according to claim 1 wherein the faces are engaged by water thrown up from said surface during said movement of the tire.

3. A pneumatic tire according to claim 1 comprising a plurality of elements moulded on at least one shoulder portion of said tire, at least one of said faces being formed on each element.

4. A pneumatic tire according to claim 1 wherein each element comprises a solid rubber block.

5. A pneumatic tire according to claim 1 wherein each element comprises a pocket which is capable of opening up to receive water, each of said faces being formed on an interior surface of said pocket.

6. A pneumatic tire according to claim 1 wherein a reinforcement is provided within each element.

7. A pneumatic tire according to claim 6 wherein said reinforcement comprises at least one layer of rubberized cord fabric.

8. A pneumatic tire according to claim 1 wherein each of said faces is part of a plane which contains the radius of the tire at that part of the shoulder portion where each face is located and which contains a line inclined at an acute angle to a line normal to that said part of the shoulder portion, the face thus being recessed.

9. A pneumatic tire according to claim 1 wherein each said faces is part of a plane which contains a line parallel to the tire axis and which contains a line inclined at an acute angle to the outward radius and the tread edge of the tire at that part of the shoulder portion where each face is located, the face thus being inclined to deflect water generally downwards.

10. A pneumatic tire according to claim 1 wherein each of said faces is cover concave.

11. A pneumatic tire according to claim 1 wherein the radially outer extremity of some at least of said faces is spaced radially inwardly of the edge of the tire tread.

12. A pneumatic tire according to claim 1 wherein each face is divided into at least two portions, each portion being inclined at a different angle to the radius of the tire at that part of the shoulder where the face is located.

13. A pneumatic tire comprising a tread portion and two sidewalls wherein there is provided a plurality of circumferentially spaced-apart elements on at least one of said sidewalls exclusively on the tire shoulder portion, the maximum width of each element in a direction locally parallel to the shoulder portion occurring at the shoulder, the width of the element being measured in a plane containing the tire axis and local tire radius, a generally radially and axially outwardly extending face being provided on each element projecting into the region adjacent to the shoulder, the radially outer extremity of the face on one element overlapping, in a circumferential sense, the radially inner extremity of the face of the adjacent element, the faces being disposed so that they will be engaged by water associated with a surface over which the tire is to run to tend to decrease the relative velocity of the tread portion and the surface during movement of the tire upon said wet surface.